(12) United States Patent
Yamaue

(10) Patent No.: US 10,297,845 B2
(45) Date of Patent: May 21, 2019

(54) FUEL CELL SYSTEM AND CONTROL METHOD OF SAME

(71) Applicant: Toyota Jidosha Kabushiki Kaisha, Toyota-shi, Aichi-ken (JP)

(72) Inventor: Keita Yamaue, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 67 days.

(21) Appl. No.: 15/515,509

(22) PCT Filed: Aug. 3, 2015

(86) PCT No.: PCT/JP2015/071965
§ 371 (c)(1),
(2) Date: Mar. 29, 2017

(87) PCT Pub. No.: WO2016/051951
PCT Pub. Date: Apr. 7, 2016

(65) Prior Publication Data
US 2017/0250419 A1 Aug. 31, 2017

(30) Foreign Application Priority Data

Oct. 2, 2014 (JP) ................................. 2014-204144

(51) Int. Cl.
*H01M 8/04* (2016.01)
*H01M 8/04302* (2016.01)
(Continued)

(52) U.S. Cl.
CPC ....... *H01M 8/04302* (2016.02); *H01M 8/045* (2013.01); *H01M 8/04231* (2013.01);
(Continued)

(58) Field of Classification Search
CPC ......... H01M 8/04302; H01M 8/04231; H01M 8/04365; H01M 8/04447; H01M 8/045;
(Continued)

(56) References Cited

U.S. PATENT DOCUMENTS 5,677,073 A * 10/1997 Kawatsu ........... H01M 8/04328
429/442
2010/0167144 A1 7/2010 Kaito et al.
(Continued)

FOREIGN PATENT DOCUMENTS

JP 2007128902 A 5/2007
JP 2008293824 A 12/2008
(Continued)

*Primary Examiner* — Anthony R Jimenez
(74) *Attorney, Agent, or Firm* — Dinsmore & Shohl LLP

(57) ABSTRACT

A first representative value is acquired representing an amount of liquid water in a hydrogen gas passage (30) when a fuel cell stack (10) is to be started up. Based on the first representative value, a first purge gas amount is calculated. A second representative value is acquired representing a concentration of hydrogen gas in a hydrogen gas passage when the fuel cell stack is to be started up. Based on the second representative value, a second purge gas amount is calculated. The greater of the first purge gas amount and the second purge gas amount is set as a startup purge gas amount. When the fuel cell stack is to be started up, hydrogen gas is fed to the fuel cell stack while the purge control valve 38 is temporally opened to purge the gas by the startup purge gas amount.

17 Claims, 7 Drawing Sheets

(51) Int. Cl.
    *H01M 8/04223*    (2016.01)
    *H01M 8/0444*     (2016.01)
    *H01M 8/04492*    (2016.01)
    *H01M 8/04746*    (2016.01)
    *H01M 8/0432*     (2016.01)
    *H01M 8/1018*     (2016.01)

(52) U.S. Cl.
    CPC ... *H01M 8/04365* (2013.01); *H01M 8/04447* (2013.01); *H01M 8/04753* (2013.01); *H01M 2008/1095* (2013.01); *H01M 2250/20* (2013.01); *Y02T 90/32* (2013.01)

(58) Field of Classification Search
    CPC ..... H01M 8/04753; H01M 2008/1095; H01M 2250/20; Y02T 90/32
    USPC ....................................................... 429/444
    See application file for complete search history.

(56) References Cited

U.S. PATENT DOCUMENTS

| | | |
|---|---|---|
| 2010/0167145 A1 | 7/2010 | Kume |
| 2013/0202976 A1 | 8/2013 | Chikugo et al. |

FOREIGN PATENT DOCUMENTS

| | | |
|---|---|---|
| JP | 2009026737 A | 2/2009 |
| JP | 2009054290 A | 3/2009 |
| JP | 2012004032 A | 1/2012 |
| WO | 2012/011501 A1 | 1/2012 |

\* cited by examiner

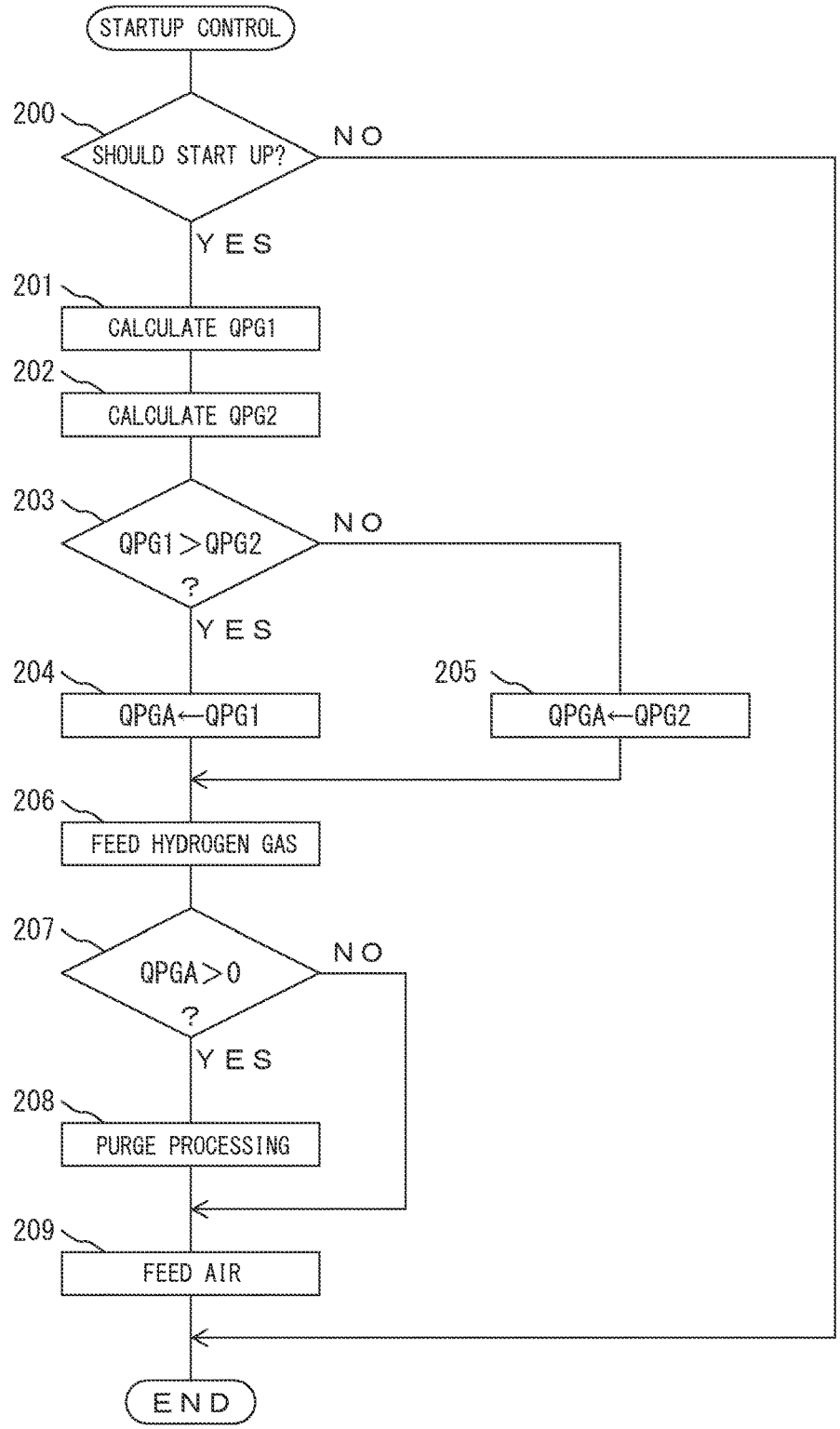

FUEL CELL SYSTEM AND CONTROL METHOD OF SAME

CROSS-REFERENCE TO RELATED APPLICATIONS

The present application is a U.S. National Stage of PCT/JP2015/071965 filed Aug. 3, 2015, which claims the benefit of priority of Japanese Patent Application No. 2014-204144 filed Oct. 2, 2014 the entire disclosure of which is incorporated herein by reference.

TECHNICAL FIELD

The present disclosure relates to a fuel cell system and a control method of the same.

BACKGROUND ART

A hydrogen recirculating-type fuel cell system is known in the art, which is provided with a fuel cell stack generating electric power by an electrochemical reaction of hydrogen gas and oxygen, a hydrogen gas feed path connecting an inlet of a hydrogen gas passage formed inside the fuel cell stack and a hydrogen gas source with each other, a hydrogen gas feed valve arranged inside the hydrogen gas feed path, an anode off-gas passage connected to an outlet of the hydrogen gas passage, a hydrogen gas return passage connecting the anode off-gas passage and the hydrogen gas feed path upstream of the hydrogen gas feed valve with each other, and a hydrogen gas return pump arranged inside the hydrogen gas return passage. In this hydrogen recirculating-type fuel cell system, unused hydrogen gas flowing out from the fuel cell stack is returned by the hydrogen gas return pump to the hydrogen gas feed path, therefore the hydrogen gas is effectively utilized.

In this regard, in a hydrogen recirculating-type fuel cell system, a hydrogen gas return passage and a hydrogen gas return pump are necessary, so the configuration becomes complicated and the cost increases. Not only this, space is required for installing the hydrogen gas return passage and hydrogen gas return pump. Therefore, a non-hydrogen recirculating-type fuel cell system is known in the art, in which a purge passage is connected to an outlet of the hydrogen gas passage of the fuel cell stack and is separated from the hydrogen gas feed path, and a purge control valve is arranged inside the purge passage (see PLT 1). In this non-hydrogen recirculating-type fuel cell system, the hydrogen gas return passage and hydrogen gas return pump are eliminated. Therefore, unused hydrogen gas flowing out from the fuel cell stack is not returned to the hydrogen gas feed path.

CITATION LIST

Patent Literature

PLT 1: Japanese Patent Publication No. 2009-054290A

SUMMARY

Technical Problem

In this regard, if power is generated in a fuel cell stack by the above-mentioned electrochemical reaction, water is produced at a cathode. Part of this water passes through each membrane electrode assembly of the fuel cell stack and reaches an anode side, that is, the inside of the hydrogen gas passage. Next, if power generation at the fuel cell stack is stopped, a temperature of the fuel cell stack is gradually lowered. As a result, a water vapor in the hydrogen gas passage condenses during the stoppage of the fuel cell stack. For this reason, when the fuel cell stack is next to be started up, that is, when power generation at the fuel cell stack is to be started, the anode is liable to be covered by excessively large amounts of liquid water. On the other hand, around the cathode, there is nitrogen gas derived from the air fed to the fuel cell stack. This nitrogen gas also passes through each membrane electrode assembly to reach the inside of the hydrogen gas passage. The movement of this nitrogen gas to the hydrogen gas passage is mainly due to the difference in concentrations at the anode side and the cathode side, so this also occurs during the stoppage of the fuel cell stack. As a result, when the fuel cell stack is to be started up, a concentration of nitrogen gas in the hydrogen gas passage is liable to become excessively high. Therefore, a concentration of hydrogen gas is liable to become excessively low. If the anode is covered by an excessively large amount of liquid water or if the concentration of hydrogen gas becomes excessively low, the fuel cell stack becomes hard to start up.

In this regard, in the above-mentioned hydrogen gas recirculating-type fuel cell system, when the fuel cell stack is to be started up, if opening the hydrogen gas feed valve while operating the hydrogen gas return pump, the liquid water and nitrogen gas in the hydrogen gas passage will be sucked in by the hydrogen gas return pump and the hydrogen gas will be broadly fed to the inside of the hydrogen gas passage. Therefore, good startup of the fuel cell stack will be secured.

In this regard, in a non-hydrogen gas recirculating-type fuel cell system such as described in PLT 1, no hydrogen gas return pump is provided. Therefore, to secure good startup of the fuel cell stack, a measure different from a hydrogen gas recirculating-type fuel cell system is required. In this regard, it is considered that, when the fuel cell stack is to be started up, if opening the hydrogen gas feed valve while temporarily opening the purge control valve, the liquid water and nitrogen gas in the hydrogen gas passage will be discharged from the hydrogen gas passage and the hydrogen gas will be broadly fed to the inside of the hydrogen gas passage. However, a gas flowing out from the fuel cell stack to the inside of the purge passage when the purge control valve is opened, that is, a purge gas, will contain unused hydrogen gas. This purge gas is released into the atmosphere. Therefore, if setting an amount of purge gas large, it is possible to make the liquid water and nitrogen gas in the hydrogen gas passage be sufficiently discharged from the hydrogen gas passage, but a large amount of hydrogen gas will be discharged from the fuel cell stack and the hydrogen gas will not be able to be effectively utilized. Conversely, if setting the amount of purge gas small, it is possible to decrease an amount of unused hydrogen as discharged from the fuel cell stack, but it is not possible to make the liquid water and nitrogen gas in the hydrogen gas passage be sufficiently discharged from the hydrogen gas passage. Therefore, it is necessary to accurately find an amount of purge gas enabling hydrogen gas to be effectively utilized while reliably making the fuel cell stack start up.

Solution to Problem

According to one aspect of the present disclosure, there is provided a fuel cell system comprising: a fuel cell stack configured to generate electric power by an electrochemical reaction between a fuel gas and an oxidant gas; a fuel gas feed path connecting an inlet of a fuel gas passage formed inside the fuel cell stack and a fuel gas source with each other; a fuel gas feeder arranged in the fuel gas feed path and configured to control a feed of fuel gas to the fuel cell stack; a purge passage connected to an outlet of the fuel gas passage and separated from the fuel gas feed path; a purge control valve arranged inside the purge passage; and a controller configured to: acquire a first representative value representing an amount of liquid water in the fuel gas passage when the fuel cell stack is to be started up; calculate a first purge gas amount based on the acquired first representative value; acquire a second representative value representing a concentration of fuel gas in the fuel gas passage when the fuel cell stack is to be started up; calculate a second purge gas amount based on the acquired second representative value; set the greater of the first purge gas amount and the second purge gas amount as a startup purge gas amount; and when the fuel cell stack is to be started up, feed fuel gas to the fuel cell stack by the fuel gas feeder and, at the same time, open the purge control valve temporarily so as to purge the gas by the startup purge gas amount.

According to another aspect of the present disclosure, there is provided a control method of a fuel cell system, the fuel cell system comprising: a fuel cell stack configured to generate electric power by an electrochemical reaction between a fuel gas and an oxidant gas; a fuel gas feed path connecting an inlet of a fuel gas passage formed inside the fuel cell stack and a fuel gas source with each other; a fuel gas feeder arranged in the fuel gas feed path and configured to control a feed of fuel gas to the fuel cell stack; a purge passage connected to an outlet of the fuel gas passage and separated from the fuel gas feed path; and a purge control valve arranged inside the purge passage, the control method of a fuel cell system configured to: acquire a first representative value representing an amount of liquid water in the fuel gas passage when the fuel cell stack is to be started up; calculate a first purge gas amount based on the acquired first representative value; acquire a second representative value representing a concentration of fuel gas in the fuel gas passage when the fuel cell stack is to be started up; calculate a second purge gas amount based on the acquired second representative value; set the greater of the first purge gas amount and the second purge gas amount as a startup purge gas amount; and when the fuel cell stack is to be started up, feed fuel gas to the fuel cell stack by the fuel gas feeder and, at the same time, open the purge control valve temporarily so as to purge the gas by the startup purge gas amount.

Advantageous Effects

It is possible to effectively utilize fuel gas while reliably starting up a fuel cell stack.

BRIEF DESCRIPTION OF DRAWINGS

FIG. 11 is a flow chart showing a routine for performing startup control.

DESCRIPTION OF EMBODIMENTS

Figure 1:
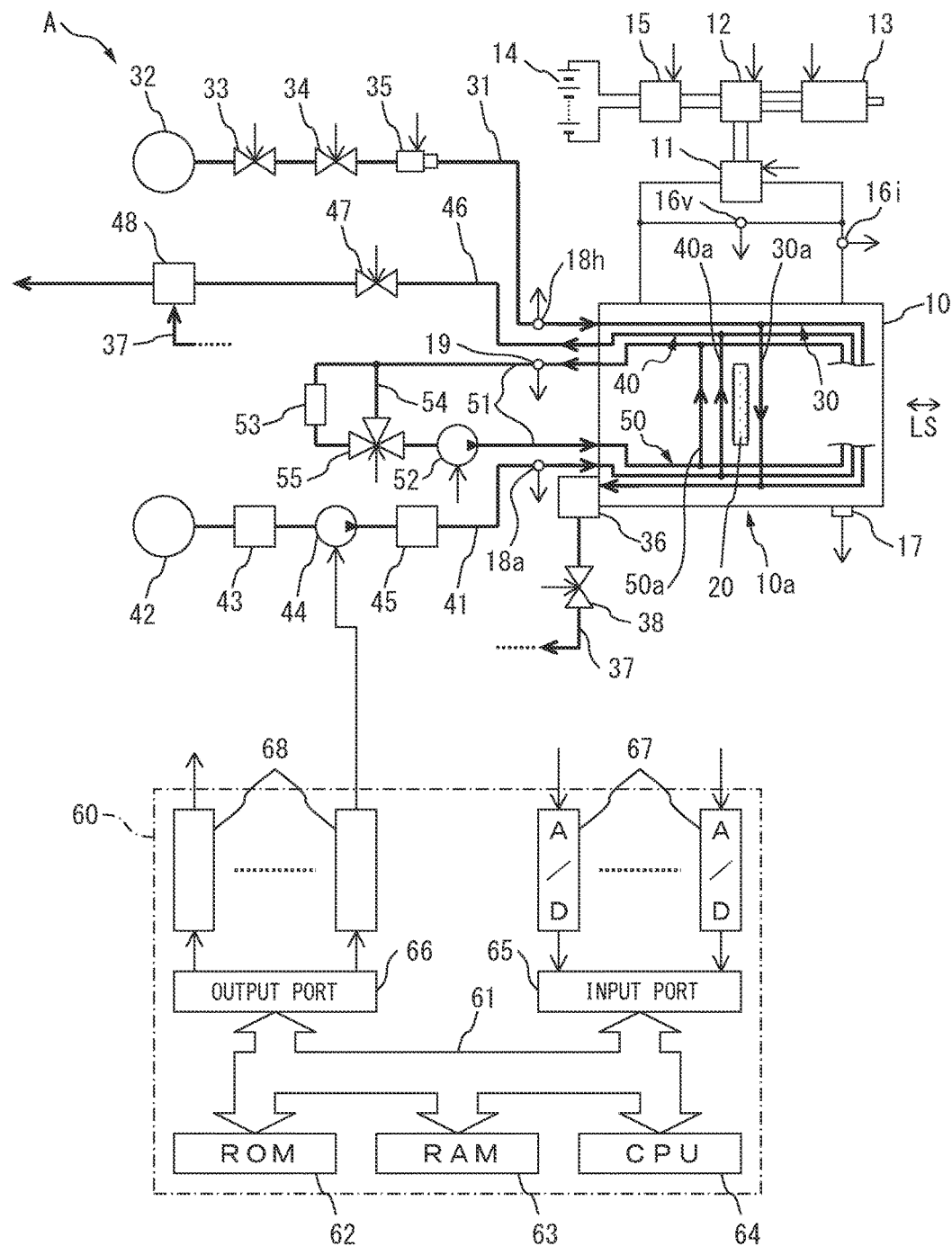
FIG. 1 is an overall view of a fuel cell system.

Referring to FIG. 1, a fuel cell system A is provided with a fuel cell stack 10. The fuel cell stack 10 is provided with a plurality of unit fuel cells 10a stacked together along a stacking direction LS. Each of the unit fuel cells 10a includes a membrane electrode assembly 20. The membrane electrode assembly 20 is provided with a membrane-shaped electrolyte, an anode formed on one side of the electrolyte, and a cathode formed on the other side of the electrolyte.

The anodes and cathodes of the unit fuel cells 10a are respectively electrically connected in series and form electrodes of the fuel cell stack 10. The electrodes of the fuel cell stack 10 are electrically connected through a DC/DC converter 11 to an inverter 12, while the inverter 12 is electrically connected to a motor-generator 13. Further, the fuel cell system A is provided with an accumulator 14. This accumulator 14 is electrically connected through a DC/DC converter 15 to the above-mentioned inverter 12. The DC/DC converter 11 is for increasing a voltage from the fuel cell stack 10 and sending it to the inverter 12, while the inverter 12 is for converting DC current from the DC/DC converter 11 or accumulator 14 to AC current. The DC/DC converter 15 is for lowering a voltage from the fuel cell stack 10 or motor-generator 13 to the accumulator 14 or increasing a voltage from the accumulator 14 to the motor-generator 13. Note that, in the fuel cell system A shown in FIG. 1, the accumulator 14 is comprised of a battery.

Further, inside of each of the unit fuel cells 10a, a hydrogen gas flow path 30a for feeding the anode with fuel gas comprised of hydrogen gas and an air flow path 40a for feeding the cathode with an oxidant gas comprised of air are formed. Between each two adjoining unit fuel cells 10a, a cooling water flow path 50a for feeding the unit fuel cells 10a with cooling water is formed. By connecting the hydrogen gas flow paths 30a, air flow paths 40a, and cooling water flow paths 50a of the plurality of unit fuel cells 10a in parallel, a hydrogen gas passage 30, air passage 40, and cooling water passage 50 are formed in the fuel cell stack 10. In the fuel cell system A shown in FIG. 1, inlets and outlets of the hydrogen gas passage 30, air passage 40, and cooling water passage 50 are respectively arranged at one end of the fuel cell stack 10 in the stacking direction LS.

In the fuel cell system A shown in FIG. 1, the inlet and outlet of the hydrogen gas flow path 30a and the outlet and inlet of the air flow path 40a are arranged adjoining each other. Therefore, a direction of the hydrogen gas flowing through the inside of the hydrogen gas flow path 30a and a direction of the air flowing through the air flow path 40a are substantially opposite to each other. That is, the fuel cell stack 10 is comprised of a counterflow-type of fuel cell stack. In another embodiment (not shown), the inlet and outlet of the hydrogen gas flow path 30a and the inlet and outlet of the air flow path 40a are respectively arranged adjoining each other. Therefore, a direction of the hydrogen gas flowing through the inside of the hydrogen gas flow path 30a and a direction of the air flowing through the air flow path 40a are substantially the same as each other. In this case, the fuel cell stack 10 is comprised of a parallel flow-type fuel cell stack.

A hydrogen gas feed path 31 is connected to an inlet of the hydrogen gas passage 30. The hydrogen gas feed path 31 is connected to a hydrogen gas source, for example, a hydrogen tank 32. Inside the hydrogen gas feed path 31, in order from an upstream side, an electromagnetic type cutoff valve 33, a regulator 34 regulating a pressure of the hydrogen gas feed path 31, and a hydrogen gas feeder 35 feeding hydrogen gas from the hydrogen gas source 32 to the fuel cell stack 10 are arranged. In the fuel cell system A shown in FIG. 1, the hydrogen gas feeder 35 is comprised of an electromagnetic-type hydrogen gas feed valve. On the other hand, a purge passage 37 is connected through a buffer tank 36 to an outlet of the hydrogen gas passage 30. Inside the purge passage 37, an electromagnetic-type purge control valve 38 is arranged. If the cutoff valve 33 and hydrogen gas feed valve 35 are opened, the hydrogen gas in the hydrogen gas source 32 is fed through the hydrogen gas feed path 31 to the hydrogen gas passage 30 in the fuel cell stack 10. At this time, the gas flowing out from the hydrogen gas passage 30, that is, an anode off-gas, flows into the buffer tank 36 and is accumulated in the buffer tank 36. The purge control valve 38 is usually closed but is periodically opened for short periods of time. If the purge control valve 38 is opened, the anode off-gas in the buffer tank 36 is discharged through the purge passage 37 into the atmosphere, that is, a purge processing is performed.

In the fuel cell system A shown in FIG. 1, an outlet of the purge passage 37 is communicated with the atmosphere. That is, the outlet of the hydrogen gas passage 30 is not communicated with the hydrogen gas feed path 31 and therefore is separated from the hydrogen gas feed path 31. This means that the anode off-gas flowing out from the outlet of the hydrogen gas passage 30 is not returned to the hydrogen gas feed path 31. In another embodiment (not shown), the outlet of the hydrogen gas passage 30 is connected through a hydrogen gas return passage to for example the hydrogen gas feed path 31 between the regulator 34 and hydrogen gas feed valve 35. In the hydrogen gas return passage, in order from an upstream side, a gas-liquid separator and a hydrogen gas return pump sending hydrogen gas separated by the gas-liquid separator to the hydrogen gas feed path 31 are arranged. In this case, the anode off-gas including the hydrogen gas is returned through the hydrogen gas return passage to the hydrogen gas feed path 31. As a result, a mixture of hydrogen gas from the hydrogen gas source 32 and hydrogen gas from the hydrogen gas return passage is fed from the hydrogen gas feed valve 35 to the fuel cell stack 10. In comparison with this other embodiment (not shown), in the fuel cell system A shown in FIG. 1, the hydrogen gas return passage, hydrogen gas return pump, etc. are eliminated. As a result, in the fuel cell system A shown in FIG. 1, the configuration is simplified, the cost is reduced, and space for the hydrogen gas return passage etc. is not required.

Further, an air feed path 41 is connected to an inlet of the air passage 40. The air feed path 41 is connected to an air source, for example, the atmosphere 42. Inside the air feed path 41, in order from an upstream side, a gas cleaner 43, air feeder or compressor 44 for feeding air under pressure, and an intercooler 45 for cooling air sent from the compressor 44 to the fuel cell stack 10 are arranged. On the other hand, a cathode off-gas passage 46 is connected to an outlet of the air passage 40. If the compressor 44 is driven, the air is fed through the air feed path 41 to the inside of the air passage 40 in the fuel cell stack 10. At this time, the air flowing out from the air passage 40, that is, a cathode off-gas, flows to the inside of the cathode off-gas passage 46. Inside the cathode off-gas passage 46, in order from an upstream side, an electromagnetic-type cathode off-gas control valve 47 controlling an amount of cathode off-gas flowing through the inside of the cathode off-gas passage 46 and a diluter 48 are arranged. The above-mentioned purge passage 37 is connected to this diluter 48. As a result, the hydrogen gas in the purge gas from the purge passage 37 is diluted by the cathode off-gas.

Further, referring to FIG. 1, one end of a cooling water feed path 51 is connected to an inlet of the cooling water passage 50, while the other end of the cooling water feed path 51 is connected to an outlet of the cooling water feed path 51. Inside the cooling water feed path 51, a cooling water pump 52 pumping out cooling water and a radiator 53 are arranged. The cooling water feed path 51 upstream of the radiator 53 and the cooling water feed path 51 between the radiator 53 and the cooling water pump 52 are connected with each other by a radiator bypass passage 54. Further, a radiator bypass control valve 55 is provided for controlling an amount of cooling water flowing through the inside of the radiator bypass passage 54. In the fuel cell system A shown in FIG. 1, the radiator bypass control valve 55 is formed from a three-way valve and is placed at an outlet of the radiator bypass passage 54. If the cooling water pump 52 is driven, the cooling water discharged from the cooling water pump 52 flows in through the cooling water feed path 51 to the inside of the cooling water passage 50 in the fuel cell stack 10, then runs through the cooling water passage 50 to flow into the cooling water feed path 51 and returns through the radiator 53 or radiator bypass passage 54 to the cooling water pump 52.

The electronic control unit 60 is comprised of a digital computer which is provided with components connected with each other by a bidirectional bus 61 such as a ROM (read only memory) 62, RAM (random access memory) 63, CPU (microprocessor) 64, input port 65, and output port 66. A voltmeter 16v and ammeter 16i for detecting an output voltage and output current of the fuel cell stack 10 and a hydrogen concentration sensor 17 for detecting a concentration of hydrogen in the hydrogen gas passage 30 are provided at the fuel cell stack 10. The hydrogen concentration sensor 17 is, for example, provided in the hydrogen gas flow path 30a in the unit fuel cell 10a at a position most separated from the inlet and output of the hydrogen gas passage 30. Further, at the hydrogen gas feed path 31 adjoining the inlet of the hydrogen gas passage 30, a hydrogen pressure sensor 18h is attached for detecting a pressure at the inlet of the hydrogen gas passage 30, while at the air feed path 41 adjoining the inlet of the air passage 40, an air pressure sensor 18a is attached for detecting a pressure at the inlet of the air passage 40. The pressure at the inlet of the hydrogen gas passage 30 represents a pressure inside the hydrogen gas flow path 30a, while the pressure at the inlet of the air passage 40 represents a pressure inside the air flow path 40a. Further, at a cooling water feed path 51 adjoining the outlet of the cooling water passage 50, a temperature sensor 19 is attached for detecting a temperature of the cooling water flowing out from the cooling water passage 50. The temperature of the cooling water flowing out from the cooling water passage 50 represents a temperature of the fuel cell stack 10 or hydrogen gas passage 30. Output signals of the voltmeter 16v, ammeter 16i, hydrogen concentration sensor 17, pressure sensors 18h, 18a, and temperature sensor 19 are respectively input through corresponding AD converters 67 to the input port 65. Note that, the CPU 64 is provided with a timer function for calculating the time. On the other hand, the output port 66 is electrically connected through corresponding drive circuits 68 to the DC/DC converter 11, inverter 12, motor-generator 13, DC/DC converter 15, cutoff valve 33, regulator 34, hydrogen gas feed valve 35, purge control valve 38, compressor 44, cathode off-gas control valve 47, cooling water pump 52, and radiator bypass control valve 55.

When the fuel cell stack 10 is to be started up, that is, when power generation at the fuel cell stack 10 is to be started up, the cutoff valve 33 and hydrogen gas feed valve 35 are opened and hydrogen gas is fed to the fuel cell stack 10. Further, the compressor 44 is driven and air is fed to the fuel cell stack 10. As a result, at the fuel cell stack 10, an electrochemical reaction ($H_2 \rightarrow 2H^+ + 2e^-$, $(\frac{1}{2})O_2 + 2H^+ + 2e^- \rightarrow H_2O$) occurs and electrical energy is generated. The thus generated electrical energy is sent to the motor-generator 13. As a result, the motor-generator 13 is operated as an electrical motor for driving a vehicle and the vehicle is driven. On the other hand, the motor-generator 13 operates as a recovery device during braking of the vehicle, for example. The electrical energy which is recovered at this time is stored in the accumulator 14. Note that, when power should be generated at the fuel cell stack 10, the cathode off-gas control valve 47 is also opened.

On the other hand, when the fuel cell stack 10 is to be stopped, that is, when the power generation at the fuel cell stack 10 should be stopped, the cutoff valve 33 and hydrogen gas feed valve 35 are closed and the feed of hydrogen gas to the fuel cell stack 10 is stopped. Further, the purge control valve 38 is also held in a closed state. As a result, the hydrogen gas feed path 31 from the hydrogen gas feed valve 35 to the purge control valve 38, the hydrogen gas passage 30, the buffer tank 36, and the purge passage 37 form a sealed space. Note that, a temperature, pressure, hydrogen gas concentration, etc. of this sealed space can be considered to be a temperature, pressure, hydrogen gas concentration, etc. of the hydrogen gas passage 30. On the other hand, when the fuel cell stack 10 is to be stopped, the compressor 44 is stopped and the feed of air to the fuel cell stack 10 is stopped. Further, the cathode off-gas control valve 47 is closed. Note that, in the embodiment shown in FIG. 1, even if the cathode off-gas control valve 47 is closed, a slight amount of air can pass through the cathode off-gas control valve 47 and flow into the air passage 40. Further, when the compressor 44 is being stopped, a slight amount of air can pass through the compressor 44 and flow into the air passage 40.

Now then, as stated at the beginning of the present specification, when the fuel cell stack 10 is to be started up, each anode is liable to be covered by an excessively large amount of liquid water or a concentration of hydrogen gas in the hydrogen gas passage 30 is liable to become excessively low. In this case, startup of the fuel cell stack is difficult.

Therefore, in the embodiment according to the present disclosure, when the fuel cell stack 10 is to be started up, the hydrogen gas feed valve 35 is opened while the purge control valve 38 is temporarily opened to perform a purge processing temporarily. As a result, discharge of the water and nitrogen gas inside the hydrogen gas passage 30 to the outside of the hydrogen gas passage 30 is promoted and a broad feed of hydrogen gas inside the hydrogen gas passage 30 is promoted. As a result, the fuel cell stack 10 can be reliably made to start up.

Figure 2:
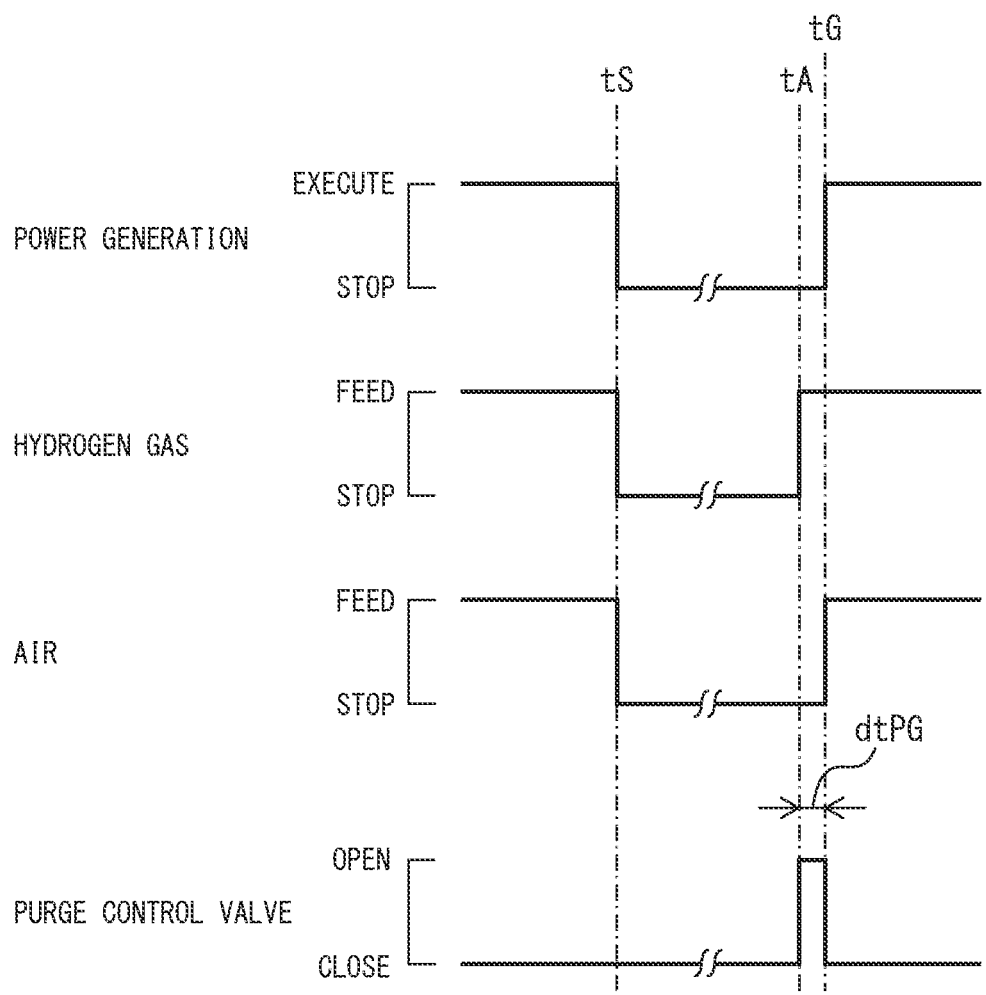
FIG. 2 is a time chart explaining stopping control and startup control in an embodiment according to the present disclosure.

That is, as shown in FIG. 2, at the time tS, if a signal is emitted for stopping the fuel cell stack 10, the feed of hydrogen gas and air to the fuel cell stack 10 is stopped and therefore the power generation at the fuel cell stack 10 is stopped. If, at the next time tA, a signal is emitted for starting up the fuel cell stack 10, first, the feed of hydrogen gas to the fuel cell stack 10 is started and the purge control valve 38 is opened. At this time, the feed of air to the fuel cell stack 10 continues to be stopped. Next, at the time tG, that is, if a preset startup purge time dtPG elapses from when the purge control valve 38 is opened, the purge control valve 38 is closed. Further, the feed of air to the fuel cell stack 10 is started. As a result, power generation at the fuel cell stack 10 is started up.

In this regard, when the purge processing is performed, the gas flowing through the purge passage 37, that is, the purge gas, contains unused hydrogen gas. This purge gas is released into the atmosphere. For this reason, if setting a startup purge gas amount QPGA corresponding to the startup purge time dtPG greater, a large amount of hydrogen gas will be discharged from the fuel cell stack 10 and the hydrogen gas will not be able to be effectively utilized. Conversely, if the startup purge gas amount QPGA is set smaller, the liquid water and nitrogen gas in the hydrogen gas passage 30 cannot be sufficiently discharged from the hydrogen gas passage 30.

Therefore, in the embodiment according to the present disclosure, a first representative value representing an amount of liquid water in the hydrogen gas passage 30 when the fuel cell stack 10 is to be started up is acquired, and, based on the acquired first representative value, a first purge gas amount QPG1 is calculated. Further, a second representative value representing a concentration of hydrogen gas in the hydrogen gas passage 30 when the fuel cell stack 10 is to be started up is acquired, and, based on the acquired second representative value, a second purge gas amount QPG2 is calculated. Based on the above, the greater of the first purge gas amount QPG1 and the second purge gas amount QPG2 is set as the startup purge gas amount QPGA.

In this case, both the amount of liquid water in the hydrogen gas passage 30 when the fuel cell stack 10 is to be started up and the concentration of hydrogen gas in the hydrogen gas passage 30 when the fuel cell stack 10 is to be started up are considered for setting the startup purge gas amount QPGA. Therefore, the liquid water and nitrogen gas in the hydrogen gas passage 30 can be sufficiently discharged from the hydrogen gas passage 30. Further, since the greater of the first purge gas amount QPG1 and the second purge gas amount QPG2 is set as the startup purge gas amount QPGA, the startup purge gas amount QPGA is set small, compared with, for example, when a total of the first purge gas amount QPG1 and the second purge gas amount QPG2 is set as the startup purge gas amount QPGA. Therefore, the hydrogen gas is effectively utilized.

Further, in the embodiment according to the present disclosure, the first purge gas amount QPG1 is an amount of purge gas required for reducing an amount of liquid water in the hydrogen gas passage 30 to a predetermined target amount. Further, the second purge gas amount QPG2 is an amount of purge gas required for increasing a concentration of hydrogen gas in the hydrogen gas passage 30 to a predetermined target concentration. As a result, the liquid water and nitrogen gas in the hydrogen gas passage 30 are reliably decreased to demanded levels and therefore the fuel cell stack 10 is reliably started up.

Figure 3:
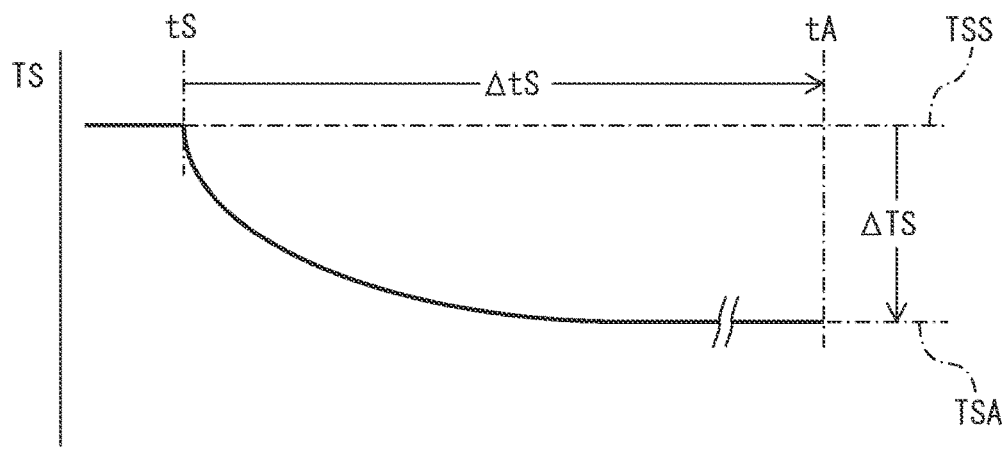
FIG. 3 is a time chart showing changes in a stack temperature TS.

Next, various examples of calculation of the first purge gas amount QPG1 will be explained. FIG. 3 shows a change in a temperature of the fuel cell stack 10, that is, a stack temperature TS, from when the fuel cell stack 10 is stopped to when it is started up. In FIG. 3, tS indicates a time at which the fuel cell stack 10 is stopped, while TSS indicates a stack temperature TS when the fuel cell stack 10 is stopped. If the fuel cell stack 10 is stopped, the stack temperature TS is lowered from TSS. If an elapsed time from when the fuel cell stack 10 is stopped becomes longer, the stack temperature TS is further lowered. Next, at the time to where the fuel cell stack 10 is to be started up, the stack temperature TS is lowered to TSA. That is, if an elapsed time $\Delta tS$ ($=tA-tS$) elapses from the time tS where the fuel cell stack 10 is stopped, the stack temperature TS is lowered by a stack temperature drop $\Delta TS$ ($=TSS-TSA$).

Figure 4:
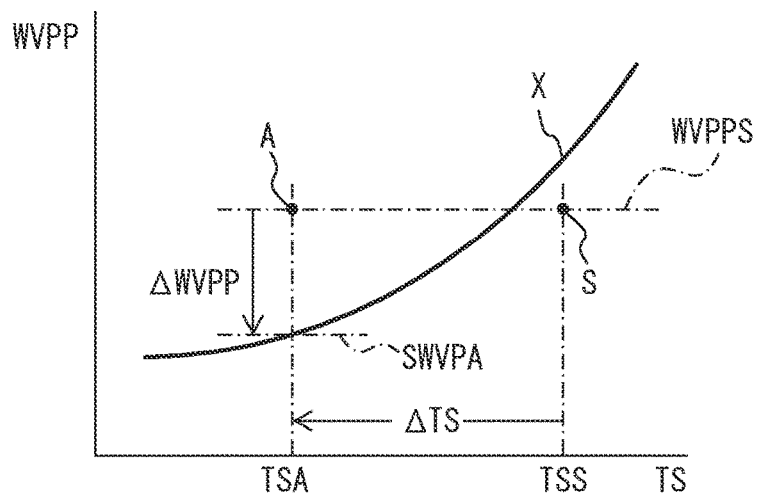
FIG. 4 is a graph explaining changes in a state of a fuel cell stack.

On the other hand, FIG. 4 shows a state S of the fuel cell stack 10 when the fuel cell stack 10 is stopped and a state A of the fuel cell stack 10 when the fuel cell stack 10 is to be started up. Here, the state of the fuel cell stack 10 is expressed by a combination of the stack temperature TS and a water vapor partial pressure WVPP in the hydrogen gas passage 30 when assuming that water in the hydrogen gas passage 30 is all water vapor. That is, as shown by the point S in FIG. 4, the stack temperature TS and water vapor partial pressure WVPP when the fuel cell stack 10 is stopped are respectively TSS and WVPPS. If the fuel cell stack 10 is stopped, as explained above, the stack temperature TS is lowered. As opposed to this, the water vapor partial pressure WVPP does not change much at all during the stoppage of the fuel cell stack 10. As a result, as shown by the point A in FIG. 4, the stack temperature TS and water vapor partial pressure WVPP when the fuel cell stack 10 is to be started up become respectively TSA and WVPPS.

FIG. 4 further shows a saturated water vapor pressure determined in accordance with the stack temperature TS by the curve X. In the example shown in FIG. 4, the saturated water vapor pressure SWVP when the fuel cell stack 10 is to be started up is SWVPA determined in accordance with the stack temperature TSA at this time. This saturated water vapor pressure SWVPA is lower than the water vapor partial pressure WVPPS by the differential pressure $\Delta WVPP$ ($=WVPPS-SWVPA$). Therefore, in a period from when the fuel cell stack 10 is stopped to when it is to be started up, that is, when the state of the fuel cell stack 10 changes from the point S to the point A, the water vapor in the hydrogen gas passage 30 condenses by an amount corresponding to the differential pressure $\Delta WVPP$. An amount of liquid water generated due to this condensation represents an amount of liquid water in the hydrogen gas passage 30 when the fuel cell stack 10 is to be started up. Therefore, the above-mentioned differential pressure $\Delta WVPP$ represents an amount of liquid water in the hydrogen gas passage 30 when the fuel cell stack 10 is to be started up. On the other hand, if the saturated water vapor pressure SWVP when the fuel cell stack 10 is to be started up is higher than the water vapor partial pressure WVPPS, water vapor does not condense in the hydrogen gas passage 30.

In this regard, a relative humidity RH (%) in the hydrogen gas passage 30 is expressed by a ratio of the water vapor partial pressure WVPP in the hydrogen gas passage 30 when assuming that all of the water in the hydrogen gas passage 30 is water vapor to the saturated water vapor pressure SWVP multiplied by 100 ($=WVPP/SWVP \cdot 100$). Therefore, the relative humidity RHA in the hydrogen gas passage 30 when the fuel cell stack 10 is to be started up is expressed by $WVPPS/SWVPA \cdot 100$. If this relative humidity RHA is lower than 100%, water vapor will not condense in the hydrogen gas passage 30 from when the fuel cell stack 10 is stopped to when it is to be started up. On the other hand, if the relative humidity RHA when the fuel cell stack 10 is to be started up is higher than 100%, water vapor condenses in the hydrogen gas passage 30 from when the fuel cell stack 10 is stopped to when it is to be started up. An amount of condensed water vapor is greater as the relative humidity RHA is higher. Therefore, the relative humidity RHA when the fuel cell stack 10 is to be started up represents an amount of liquid water in the hydrogen gas passage 30 when the fuel cell stack 10 is to be started up.

Figure 5:
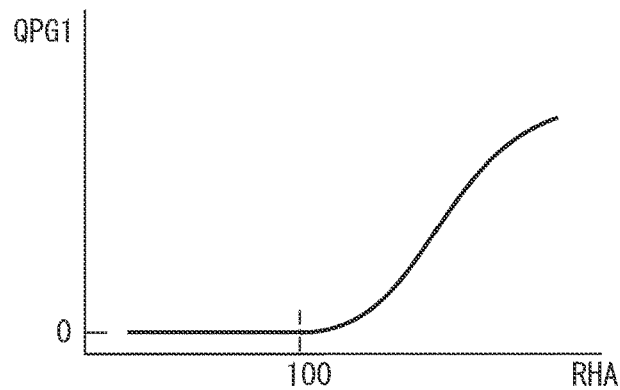
FIG. 5 is a view showing a map of a first purge gas amount QPG1 in a first calculation example of the first purge gas amount QPG1.

Therefore, in a first calculation example of the first purge gas amount QPG1, the relative humidity RHA when the fuel cell stack 10 is to be started up is found and, based on the relative humidity RHA, the first purge gas amount QPG1 is calculated. Specifically, as shown in FIG. 5, the first purge gas amount QPG1 is maintained at zero if the relative humidity RHA is lower than 100% and becomes greater as the relative humidity RHA becomes higher if the relative humidity RHA is higher than 100%. This first purge gas amount QPG1 is stored in the form of a map shown in FIG. 5 in advance in the ROM 62.

Explained further, in the first calculation example of the first purge gas amount QPG1, during operation of the fuel cell stack 10, an amount of water QW inside the fuel cell stack 10, that is, inside the membrane electrode assemblies 20, inside the hydrogen gas passage 30, and inside the air passage 40, is successively calculated. Based on this amount of water QW, the above-mentioned water vapor partial pressure WVPP is successively calculated. Specifically, an amount of increase qwi and an amount of decrease qwd of the amount of water QW in the fuel cell stack 10 per unit time are repeatedly calculated. The amount of increase qwi and amount of decrease qwd are cumulatively added so as to calculate the amount of water QW ($QW=QW0+(qwi-qwd)$, QW0 being the previous value). The amount of increase qwi is calculated based on an amount of power generation per unit time of the fuel cell stack 10. The amount of power generation of the fuel cell stack 10 is calculated based on the output voltage and output current of the fuel cell stack 10. The output voltage and output current of the fuel cell stack 10 are detected by the voltmeter 16$v$ and ammeter 16$i$ respectively. The amount of decrease qwd corresponds to an amount of water flowing out from the fuel cell stack 10 together with the cathode off-gas per unit time and is calculated based on an amount of air fed to the air passage 40 and a pressure inside the air passage 40. The amount of air fed to the air passage 40 is calculated based on an output of the compressor 44, while the pressure inside the air passage 40 is detected by the air pressure sensor 18$a$. Based on the above, when the fuel cell stack 10 is stopped, the water vapor partial pressure WVPP at this time is stored as the above-mentioned water vapor partial pressure WVPPS. Next, when the fuel cell stack 10 is to be started up, the temperature sensor 19 is used to detect the stack temperature TS at this time as the above-mentioned TSA. Next, from the stack temperature TSA, the saturated water vapor pressure SWVPA when the fuel cell stack 10 is to be started up is calculated. Note that a relationship between the stack temperature TS and the saturated water vapor pressure SWVP is stored in the form of a map shown in FIG. 4 in the ROM 62. Next, the relative humidity RHA when the fuel cell stack 10 is to be started up is calculated ($RHA=WVPPS/$ SWVPA·100). Next, using the map of FIG. 5, the first purge gas amount QPG1 is calculated.

On the other hand, as will be understood from FIG. 4, as the stack temperature drop ΔTS becomes greater, the differential pressure ΔWVPP becomes greater. Therefore, the stack temperature drop ΔTS also represents an amount of liquid water in the hydrogen gas passage 30 when the fuel cell stack 10 is to be started up.

Figure 6:
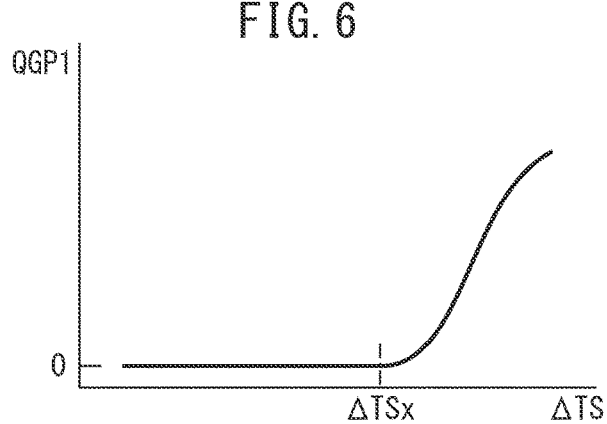
FIG. 6 is a view showing a map of a first purge gas amount QPG1 in a second calculation example of the first purge gas amount QPG1.

Therefore, in a second calculation example of the first purge gas amount QPG1, when the fuel cell stack 10 is to be started up, the stack temperature drop ΔTS is found and, based on the stack temperature drop ΔTS, the first purge gas amount QPG1 is calculated. Specifically, as shown in FIG. 6, the first purge gas amount QPG1 is maintained at zero if the stack temperature drop ΔTS is smaller than a threshold amount ΔTS× and becomes larger as the stack temperature drop ΔTS becomes larger if the stack temperature drop ΔTS is larger than the threshold amount ΔTS×. The first purge gas amount QPG1 is stored in the form of a map shown in FIG. 6 in advance in the ROM 62.

Explained further, in the second calculation example of the first purge gas amount QPG1, when fuel cell stack 10 is stopped, the temperature sensor 19 is used to detect the stack temperature TS at this time as the above-mentioned TSS. Next, when the fuel cell stack 10 is to be started up, the temperature sensor 19 is used to detect the stack temperature TS at this time as the above-mentioned TSA. Next, the stack temperature drop ΔTS is calculated (ΔTS=TSS−TSA), and the first purge gas amount QPG1 is calculated using the map of FIG. 6.

Accordingly, the above-mentioned first representative value is a relative humidity RHA at the hydrogen gas passage 30 when the fuel cell stack 10 is to be started up in the first calculation example of the first purge gas amount QPG1, and is an amount of change ΔTS of the temperature TSA of the fuel cell stack when the fuel cell stack 10 is to be started up with respect to the temperature TSS of the fuel cell stack when the fuel cell stack 10 is stopped in the second calculation example of the first purge gas amount QPG1.

In another embodiment (not shown), the differential pressure ΔWVPP explained with reference to FIG. 4 is found and, based on the differential pressure ΔWVPP, the first purge gas amount QPG1 is calculated. In this case, the first purge gas amount QPG1 becomes greater as the differential pressure ΔWVPP becomes larger. Further, the first representative value in this case is the differential pressure ΔWVPP.

Figure 7:
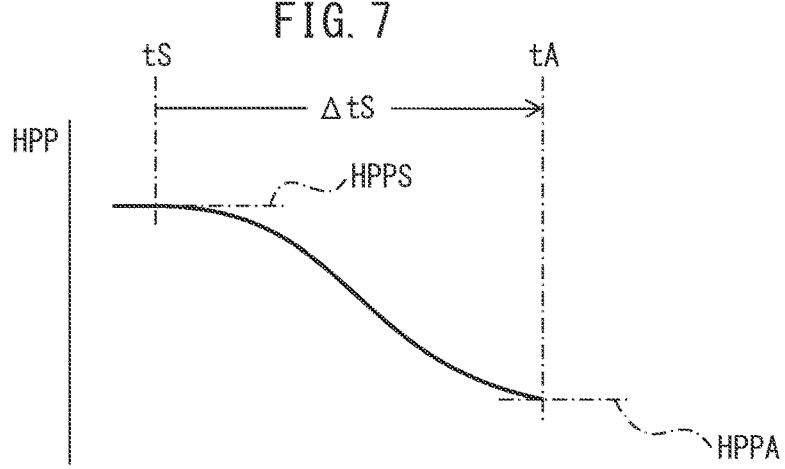
FIG. 7 is a time chart showing changes in a hydrogen gas partial pressure HPP.

Next, various calculation examples of the second purge gas amount QPG2 will be explained. FIG. 7 shows a change in the hydrogen gas partial pressure HPP in the hydrogen gas passage 30 from when the fuel cell stack 10 is stopped to when it is started up. In FIG. 7, tS indicates the time at which the fuel cell stack 10 is stopped, while HPPS indicates the hydrogen gas partial pressure HPP when the fuel cell stack 10 is stopped. If the fuel cell stack 10 is stopped, the hydrogen gas partial pressure HPP is lowered from the HPPS. If an elapsed time from when the fuel cell stack 10 was stopped becomes longer, the hydrogen gas partial pressure HPP is further lowered. Next, at the time to when the fuel cell stack 10 is to be started up, the hydrogen gas partial pressure HPP is lowered to HPPA. This is because the nitrogen gas in the air passage 40 passes through the membrane electrode assembly 20 due to a difference in concentration and moves inside the hydrogen gas passage 30 and therefore the nitrogen gas partial pressure in the hydrogen gas passage 30 increases. In this case, the hydrogen gas partial pressure HPP becomes lower as the elapsed time from when the fuel cell stack 10 was stopped becomes longer. Therefore, the elapsed time ΔtS from when fuel cell stack 10 is stopped to when the fuel cell stack 10 is to be started up represents the hydrogen gas partial pressure HPP when the fuel cell stack 10 is to be started up.

Figure 8:
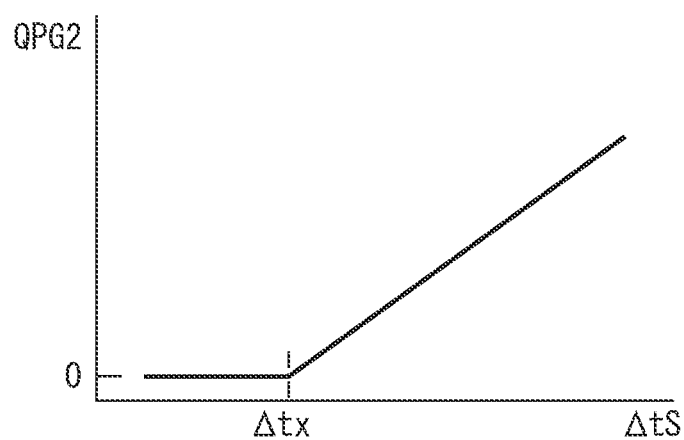
FIG. 8 is a view showing a map of a second purge gas amount QPG2 in a first calculation example of the second purge gas amount QPG2.

Therefore, in a first calculation example of the second purge gas amount QPG2, when the fuel cell stack 10 is to be started up, the elapsed time ΔtS is found and based on the elapsed time ΔtS, the second purge gas amount QPG2 is calculated. Specifically, as shown in FIG. 8, the second purge gas amount QPG2 is maintained at zero if the elapsed time ΔtS is shorter than a threshold time Δtx and becomes greater as the elapsed time ΔtS becomes longer if the elapsed time ΔtS is longer than the threshold time Δtx. This second purge gas amount QPG2 is stored in the form of a map shown in FIG. 8 in advance in the ROM 62.

Explained further, in the first calculation example of the second purge gas amount QPG2, when the fuel cell stack 10 is stopped, the time tS at this time is detected and is stored. Next, the time to when the fuel cell stack 10 is to be started up is detected and the elapsed time ΔtS (=tS−tA) is calculated. Next, using the map of FIG. 8, the second purge gas amount QPG2 is calculated.

Figure 9:
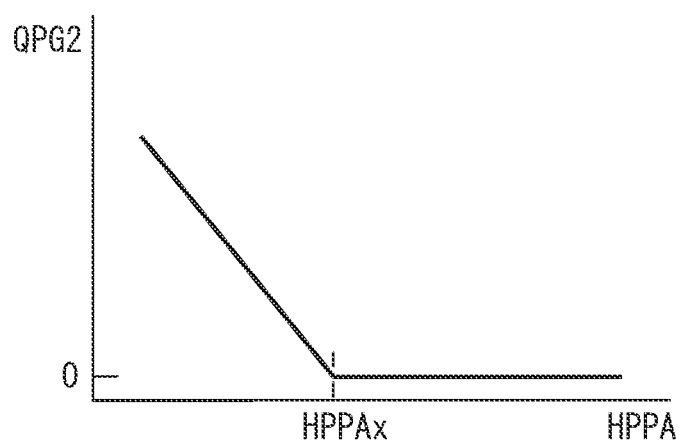
FIG. 9 is a view showing a map of a second purge gas amount QPG2 in a second calculation example of the second purge gas amount QPG2.

Next, a second calculation example of the second purge gas amount QPG2 will be explained. In the second calculation example of the second purge gas amount QPG2, the hydrogen gas partial pressure HPPA when the fuel cell stack 10 is to be started up is found. Based on the hydrogen gas partial pressure HPPA, the second purge gas amount QPG2 is calculated. Specifically, as shown in FIG. 9, the second purge gas amount QPG2 is maintained at zero if the hydrogen gas partial pressure HPPA is higher than a threshold partial pressure HPPAx, and becomes greater as the hydrogen gas partial pressure HPPA becomes lower if the hydrogen gas partial pressure HPPA is lower than the threshold partial pressure HPPAx. This second purge gas amount QPG2 is stored in the form of a map shown in FIG. 9 in advance in the ROM 62.

The hydrogen gas partial pressure HPPA when the fuel cell stack 10 is to be started up is for example calculated or estimated in the following way. That is, during operation of the fuel cell stack 10, the hydrogen gas partial pressure HPP in the hydrogen gas passage 30 is successively calculated. Specifically, based on a difference between the pressure in the hydrogen gas passage 30 detected by the hydrogen pressure sensor 18*h* and the pressure inside the air passage 40 detected by the air pressure sensor 18*a* and the Fick's laws, an amount of nitrogen gas penetrating from the air passage 40 to the membrane electrode assembly 20 and moving to the hydrogen gas passage 30 per unit time is successively calculated. Next, based on this nitrogen gas amount and pressure inside the hydrogen gas passage 30, a nitrogen gas partial pressure NPP in the hydrogen gas passage 30 is calculated. Next, the nitrogen gas partial pressure NPP is subtracted from the pressure inside the hydrogen gas passage 30 to calculate the hydrogen gas partial pressure HPP. Based on the above, the hydrogen gas partial pressure HPP when the fuel cell stack 10 is stopped is stored as the hydrogen gas partial pressure HPPS explained with reference to FIG. 7. Further, the time tS when the fuel cell stack 10 is stopped is detected and is stored. Next, when the fuel cell stack 10 is to be started up, the time to is detected and the elapsed time ΔtS (=tS−tA) is calculated. Next, an amount of hydrogen gas from the hydrogen gas passage 30 passing through the membrane electrode assembly 20 and flowing out into the air passage 40 and an amount of nitrogen gas from the air passage 40 passing through the membrane electrode assembly 20 and flowing into the hydrogen gas passage 30 in a period from when the fuel cell stack 10 is stopped to when it is to be started up, that is, the elapsed time ΔtS, are respectively calculated based on the elapsed time ΔtS and the Fick's laws. Note that it is assumed that the hydrogen gas moved into the air passage 40 during the stoppage of the fuel cell stack 10 reacts with the oxygen in the air passage 40 to generate water. Next, based on the hydrogen gas partial pressure HPPS when the fuel cell stack 10 is stopped and on the amount of hydrogen gas flowing out from the hydrogen gas passage 30 and the amount of nitrogen gas flowing into the hydrogen gas passage 30 during the elapsed time ΔtS, the hydrogen gas partial pressure HPPA when the fuel cell stack 10 is to be started up is calculated. Next, the second purge gas amount QPG2 is calculated using the map of FIG. 9.

Accordingly, the above-mentioned second representative value is an elapsed time ΔtS from when the fuel cell stack 10 is stopped to when it is to be started up in the first calculation example of the second purge gas amount QPG2, and is a hydrogen gas partial pressure HPPA in the hydrogen gas passage 30 when the fuel cell stack 10 is to be started up in the second calculation example of the second purge gas amount QPG2.

In another embodiment (not shown), the second purge gas amount QPG2 is calculated based on a concentration of hydrogen gas detected by the hydrogen concentration sensor 17.

In this regard, as explained above referring to FIG. 2, when the fuel cell stack 10 is to be started up, air starts to be fed to the fuel cell stack 10 after the temporal opening of the purge control valve 38 is finished. In other words, before the purge processing is completed, air is not fed to the fuel cell stack 10 and, therefore, power is not generated at the fuel cell stack 10. This is because, even if air is fed to the fuel cell stack 10 before the purge action is completed, good power generation may not be performed at the fuel cell stack 10. Therefore, in the embodiment according to the present disclosure, the air fed to the fuel cell stack 10 can be effectively utilized.

Figure 10:
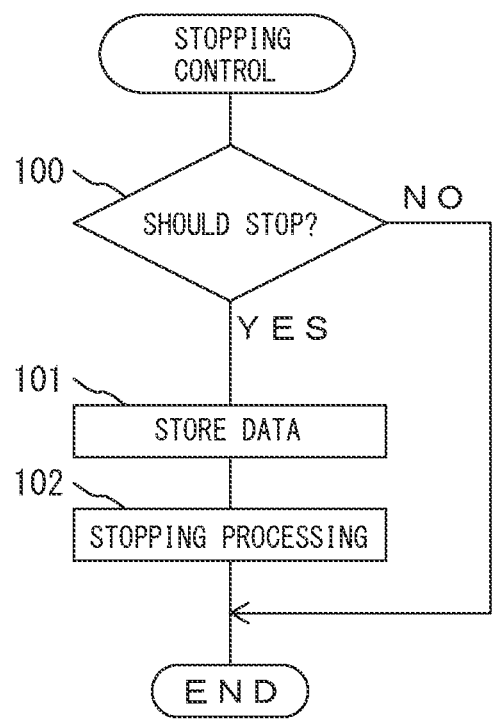
FIG. 10 is a flow chart showing a routine for performing stopping control.

FIG. 10 shows a routine for execution of stop control in the embodiment according to the present disclosure. This routine is executed by interruption at predetermined set time intervals. Referring to FIG. 10, at step 100, it is judged if the fuel cell stack 10 should be stopped. If the fuel cell stack 10 is not to be stopped, the processing cycle is ended. If the fuel cell stack 10 is to be stopped, next, the routine proceeds to step 101 where the necessary data are stored. At the next step 102, a processing for stopping the fuel cell stack 10 is performed. That is, the cutoff valve 33, hydrogen gas feed valve 35, purge control valve 38, and cathode off-gas control valve 47 are closed and the compressor 44 is stopped.

FIG. 11 shows a routine for startup control of the embodiment according to the present disclosure. This routine is executed by interruption at predetermined set time intervals. Referring to FIG. 11, at step 200, it is judged if the fuel cell stack 10 is to be started up. If the fuel cell stack 10 is not to be started up, the processing cycle is ended. If the fuel cell stack 10 is to be started up, next, the routine proceeds to step 201 where the first purge gas amount QPG1 is calculated. At the next step 202, the second purge gas amount QPG2 is calculated. At the next step 203, it is judged if the first purge gas amount QPG1 is greater than the second purge gas amount QPG2. If QPG1>QPG2, next, the routine proceeds to step 204 where the first purge gas amount QPG1 is set to the startup purge gas amount QPGA. Next, the routine proceeds to step 206. As opposed to this, if QPG1≤QPG2, the routine proceeds from step 203 to step 205 where the second purge gas amount QPG2 is set to the startup purge gas amount QPGA. Next, the routine proceeds to step 206.

At step 206, the cutoff valve 33 and hydrogen gas feed valve 35 are opened, therefore the feed of hydrogen gas to the fuel cell stack 10 is started up. At the next step 207, it is judged if the startup purge gas amount QPGA is greater than zero. If QPGA≤0, the routine jumps from step 207 to step 209. If QPGA>0, that is, if purging processing is to be performed, the routine proceeds from step 207 to step 208 where the purge control valve 38 is temporarily opened so that the purge gas is purged by the startup purge gas amount QPGA. Next, the routine proceeds to step 209. At step 209, the compressor 44 is opened and the cathode off-gas control valve 47 is opened. As a result, the feed of air to the fuel cell stack 1 is started. Therefore, the fuel cell stack 10 is started up, that is, power starts to be generated at the fuel cell stack 10.

Note that, in the first calculation example of the first purge gas amount QPG1, at step 101 of FIG. 10, the water vapor partial pressure WVPPS is read and stored. Further, at step 201 of FIG. 11, the stack temperature TSA is detected, the saturated water vapor pressure SWVPA is calculated, and, using the map of FIG. 4, the first purge gas amount QPG1 is calculated. On the other hand, in the second calculation example of the first purge gas amount QPG1, at step 101 of FIG. 10, the stack temperature TSS is detected and is stored. Further, at step 201 of FIG. 11, the stack temperature TSA is detected, the stack temperature drop ΔTS is calculated, and, using the map of FIG. 6, the first purge gas amount QPG1 is calculated.

In the first calculation example of the second purge gas amount QPG2, at step 101 of FIG. 10, the time tS is detected and is stored. Further, at step 202 of FIG. 11, the time to is detected, the elapsed time ΔtS is calculated, and, using the map of FIG. 8, the second purge gas amount QPG2 is calculated. On the other hand, in the second calculation example of the second purge gas amount QPG2, at step 101 of FIG. 10, the hydrogen gas partial pressure HPPS is read and stored. Further, at step 202 of FIG. 11, the time tA is detected, the elapsed time ΔtS is calculated, the amount of hydrogen gas flowing out from the hydrogen gas passage 30, and the amount of nitrogen gas flowing into the hydrogen gas passage 30 during the elapsed time ΔtS are calculated, the hydrogen gas partial pressure HPPA is calculated, and, using the map of FIG. 9, the second purge gas amount QPG2 is calculated.

In another embodiment (not shown), there are provided a stack bypass passage connecting together the air feed path 41 downstream, for example, of the intercooler 45 and the cathode off-gas passage 46 downstream of the cathode off-gas control valve 47, and a stack bypass control valve controlling an amount of air discharged from the compressor 44 and then fed to the fuel cell stack 10 and an amount of air discharged from the compressor 44 and then flowing into the cathode off-gas passage through the stack bypass passage, that is, an amount of air bypassing the fuel cell stack 10. In this other embodiment, the compressor 44 is operated in a period from the time tA to the time tG shown in FIG. 2, that is, during a period where a purge processing is performed, and the stack bypass control valve is used to send all of the air discharged from the compressor 44 to the stack bypass passage. As a result, the feed of air to the fuel cell stack 10 is stopped while air is fed into the diluter 48. Therefore, the hydrogen gas flowing into the diluter 48 through the purge passage 37 by the purge processing is diluted by this air.

REFERENCE SIGNS LIST

A. fuel cell system
10. fuel cell stack
30. hydrogen gas passage
31. hydrogen gas feed path
32. hydrogen gas source
35. hydrogen gas feed valve
37. purge passage
38. purge control valve

The invention claimed is:

1. A fuel cell system comprising:
   a fuel cell stack configured to generate electric power by an electrochemical reaction between a fuel gas and an oxidant gas;
   a fuel gas feed path connecting an inlet of a fuel gas passage formed inside the fuel cell stack and a fuel gas source with each other;
   a fuel gas feeder arranged in the fuel gas feed path and configured to control a feed of fuel gas to the fuel cell stack;
   a purge passage connected to an outlet of the fuel gas passage and separated from the fuel gas feed path;
   a purge control valve arranged inside the purge passage; and
   a controller configured to:
      acquire a first representative value representing an amount of liquid water in the fuel gas passage when the fuel cell stack is to be started up;
      calculate a first purge gas amount based on the acquired first representative value;
      acquire a second representative value representing a concentration of fuel gas in the fuel gas passage when the fuel cell stack is to be started up;
      calculate a second purge gas amount based on the acquired second representative value;
      set the greater of the first purge gas amount and the second purge gas amount as a startup purge gas amount; and
      when the fuel cell stack is to be started up, feed fuel gas to the fuel cell stack by the fuel gas feeder and, at the same time, open the purge control valve temporarily so as to purge the gas by the startup purge gas amount.

2. The fuel cell system according to claim 1, wherein the first purge gas amount is a purge gas amount necessary for making an amount of liquid water in the fuel gas passage decrease to a predetermined target amount.

3. The fuel cell system according to claim 1, wherein the second purge gas amount is a purge gas amount necessary for making a concentration of fuel gas in the fuel gas passage increase to a predetermined target concentration.

4. The fuel cell system according to claim 1, wherein the first representative value is a relative humidity in the fuel gas passage when the fuel cell stack is to be started up.

5. The fuel cell system according to claim 1, wherein the first representative value is an amount of change of a temperature of the fuel cell stack when the fuel cell stack is to be started up with respect to a temperature of the fuel cell stack when the fuel cell stack was stopped.

6. The fuel cell system according to claim 1, wherein the second representative value is an elapsed time from when the fuel cell stack is stopped to when it is to be started up.

7. The fuel cell system according to claim 1, wherein the second representative value is a fuel gas partial pressure in the fuel gas passage when the fuel cell stack is to be started up.

8. The fuel cell system according to claim 1, wherein the controller is configured to start feed of oxidant gas to the fuel cell stack after the temporal opening of the purge control valve is finished, when the fuel cell stack is to be started up.

9. A control method of a fuel cell system, the fuel cell system comprising:
   a fuel cell stack configured to generate electric power by an electrochemical reaction between a fuel gas and an oxidant gas;
   a fuel gas feed path connecting an inlet of a fuel gas passage formed inside the fuel cell stack and a fuel gas source with each other;
   a fuel gas feeder arranged in the fuel gas feed path and configured to control a feed of fuel gas to the fuel cell stack;
   a purge passage connected to an outlet of the fuel gas passage and separated from the fuel gas feed path; and
   a purge control valve arranged inside the purge passage,
   the control method of a fuel cell system configured to:
      acquire a first representative value representing an amount of liquid water in the fuel gas passage when the fuel cell stack is to be started up;
      calculate a first purge gas amount based on the acquired first representative value;
      acquire a second representative value representing a concentration of fuel gas in the fuel gas passage when the fuel cell stack is to be started up;
      calculate a second purge gas amount based on the acquired second representative value;
      set the greater of the first purge gas amount and the second purge gas amount as a startup purge gas amount; and
      when the fuel cell stack is to be started up, feed fuel gas to the fuel cell stack by the fuel gas feeder and, at the same time, open the purge control valve temporarily so as to purge the gas by the startup purge gas amount.

10. A fuel cell system comprising:
    a fuel cell stack configured to generate electric power by an electrochemical reaction between a fuel gas and an oxidant gas;
    a fuel gas feed path connecting an inlet of a fuel gas passage formed inside the fuel cell stack and a fuel gas source with each other;
    a fuel gas feeder arranged in the fuel gas feed path and configured to control a feed of fuel gas to the fuel cell stack;
    a purge passage connected to an outlet of the fuel gas passage and separated from the fuel gas feed path;
    a purge control valve arranged inside the purge passage; and
    an electronic control unit configured to:
       acquire a first representative value representing an amount of liquid water in the fuel gas passage when the fuel cell stack is to be started up;
       calculate a first purge gas amount based on the acquired first representative value;
       acquire a second representative value representing a concentration of fuel gas in the fuel gas passage when the fuel cell stack is to be started up;
       calculate a second purge gas amount based on the acquired second representative value;
       set the greater of the first purge gas amount and the second purge gas amount as a startup purge gas amount; and
       when the fuel cell stack is to be started up, feed fuel gas to the fuel cell stack by the fuel gas feeder and, at the same time, open the purge control valve temporarily so as to purge the gas by the startup purge gas amount.

11. The fuel cell system according to claim 10, wherein the first purge gas amount is a purge gas amount necessary for making an amount of liquid water in the fuel gas passage decrease to a predetermined target amount.

12. The fuel cell system according to claim 10, wherein the second purge gas amount is a purge gas amount necessary for making a concentration of fuel gas in the fuel gas passage increase to a predetermined target concentration.

13. The fuel cell system according to claim 10, wherein the first representative value is a relative humidity in the fuel gas passage when the fuel cell stack is to be started up.

14. The fuel cell system according to claim 10, wherein the first representative value is an amount of change of a temperature of the fuel cell stack when the fuel cell stack is to be started up with respect to a temperature of the fuel cell stack when the fuel cell stack was stopped.

15. The fuel cell system according to claim 10, wherein the second representative value is an elapsed time from when the fuel cell stack is stopped to when it is to be started up.

16. The fuel cell system according to claim 10, wherein the second representative value is a fuel gas partial pressure in the fuel gas passage when the fuel cell stack is to be started up.

17. The fuel cell system according to claim 10, wherein the electronic control unit is configured to start feed of oxidant gas to the fuel cell stack after the temporal opening of the purge control valve is finished, when the fuel cell stack is to be started up.

* * * * *